United States Patent
Green et al.

(10) Patent No.: US 7,894,157 B2
(45) Date of Patent: Feb. 22, 2011

(54) VARIABLE SPRING-FORCE MECHANISM FOR ADVANCING TAPE MEDIA CARTRIDGES IN A DEEP SLOT CELL

(75) Inventors: Andrew Stuart Green, Tucson, AZ (US); Shawn Michael Nave, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 11/837,392

(22) Filed: Aug. 10, 2007

(65) Prior Publication Data
US 2009/0040653 A1    Feb. 12, 2009

(51) Int. Cl.
G11B 15/68    (2006.01)
B65D 85/575    (2006.01)
(52) U.S. Cl. .............. 360/92.1; 369/30.66; 206/387.12; 312/9.38
(58) Field of Classification Search ................ 360/92.1; 206/387.12; 312/9.22, 9.38, 319.1; 221/279; 211/51, 59.3; 369/30.66
See application file for complete search history.

(56) References Cited

U.S. PATENT DOCUMENTS

| | | | | |
|---|---|---|---|---|
| 2,273,644 A | * | 2/1942 | Hope | 221/279 |
| 4,027,415 A | * | 6/1977 | Stoner | 42/50 |
| 4,042,096 A | * | 8/1977 | Smith | 211/85.18 |
| 4,068,546 A | * | 1/1978 | Werkmeister | 82/1.11 |
| 4,632,248 A | * | 12/1986 | Hsu | 206/387.12 |
| 4,757,400 A | * | 7/1988 | Park | 360/96.51 |
| 5,011,015 A | * | 4/1991 | Ziegler et al. | 206/387.12 |
| 5,184,260 A | * | 2/1993 | Pierrat | 360/92.1 |
| 5,190,186 A | * | 3/1993 | Yablans et al. | 221/124 |
| 5,231,552 A | | 7/1993 | Schneider et al. | 360/92 |
| 5,469,310 A | | 11/1995 | Slocum et al. | 360/92 |
| 5,833,076 A | * | 11/1998 | Harres et al. | 211/51 |
| 5,893,669 A | | 4/1999 | Sugai et al. | |
| 6,104,564 A | | 8/2000 | Shibuya et al. | 360/69 |
| 6,256,017 B1 | | 7/2001 | Bullister | 345/168 |
| 6,526,017 B1 | | 2/2003 | Smith | |
| 6,781,789 B2 | * | 8/2004 | Ostwald | 360/92.1 |
| 6,813,113 B1 | | 11/2004 | Mueller et al. | 360/92 |
| 7,063,217 B2 | * | 6/2006 | Burke | 211/59.3 |
| 7,072,139 B2 | | 7/2006 | Tsuchiya | 360/96.5 |
| 7,104,618 B2 | | 9/2006 | Chaloner et al. | 312/9.43 |
| 7,424,957 B1 | * | 9/2008 | Luberto | 211/59.3 |

(Continued)

FOREIGN PATENT DOCUMENTS

JP    05120776 A  *  5/1993

*Primary Examiner*—William J Klimowicz
(74) *Attorney, Agent, or Firm*—Kunzler Needham Massey & Thorpe

(57) ABSTRACT

An apparatus to generate a spring force increasing in accordance with a quantity of tape media cartridges stored in a deep slot cell. The apparatus may include a deep slot cell, a biasing element including a torsion spring, and an advancement element. The deep slot cell may store one or more cartridges. The biasing element may generate a spring force toward the front of the deep slot cell such that the spring force generated increases in accordance with a number of cartridges stored in the cell. The advancement element may be positioned to apply the spring force to the cartridges, thereby advancing the cartridges toward the front of the deep slot cell.

20 Claims, 6 Drawing Sheets

U.S. PATENT DOCUMENTS

| | | | |
|---|---|---|---|
| 7,477,478 B2* | 1/2009 | Nave et al. | 360/92.1 |
| 7,505,224 B2* | 3/2009 | Chamorro et al. | 360/92.1 |
| 2003/0063411 A1* | 4/2003 | Ostwald | 360/92 |
| 2005/0098515 A1* | 5/2005 | Close | 211/59.3 |
| 2007/0230036 A1* | 10/2007 | Nave et al. | 360/92 |
| 2008/0157446 A1* | 7/2008 | Nave et al. | 267/103 |
| 2008/0231988 A1* | 9/2008 | Nave et al. | 360/92.1 |
| 2009/0238055 A1* | 9/2009 | Kawasaki | 369/75.11 |
| 2010/0097718 A1* | 4/2010 | Wada et al. | 360/92.1 |

* cited by examiner

VARIABLE SPRING-FORCE MECHANISM FOR ADVANCING TAPE MEDIA CARTRIDGES IN A DEEP SLOT CELL

BACKGROUND OF THE INVENTION

1. Field of the Invention

The invention relates to systems and methods for advancing tape media cartridges in an automated tape library. Specifically, the invention relates to apparatus, systems and methods for generating a spring force to advance tape cartridges in a deep slot cell, where the spring force increases in accordance with the number of tape cartridges in the cell.

2. Description of the Related Art

Automated tape libraries ("ATLs") provide high capacity data storage at low cost, with current ATLs equipped to provide about ten thousand times the capacity of a typical hard drive. As a result, ATLs are used extensively as enabling hardware in backup and recovery systems.

In operation, ATLs utilize physical tape drives to read and write data to tape media cartridges for storage. Tape media cartridge slots hold the tape media cartridges inside the ATL, and a robotic mechanism, or "picker," moves tape media cartridges between their slot and another location as needed. For example, the picker may transport a particular tape media cartridge to the tape drive, another slot, or a cartridge access port for import or export from the library.

Recent advances in automated tape library technology include deep slot cells that are able to hold multiple tape media cartridges at a time. Such deep slot cells provide increased storage density, thereby facilitating increased data storage capacity. In use, tape media cartridges in a deep slot cell must be advanced to a frontmost position in the cell to enable the picker to access and transport the cartridge.

One method for advancing tape media cartridges in a deep slot cell uses a flat sheet spring to apply a substantially constant force on the tape media cartridges in the cell. While this method succeeds in pushing tape media cartridges forward with only a nominal impact on storage density, it does not account for the variation in frictional load that results when a tape media cartridge is removed.

Indeed, the major force that must be overcome to advance cartridges from the back of the cell to the front of the cell is friction resulting from the interaction of the cartridge with the cell. Each individual cartridge contributes to the total frictional load. Accordingly, the force needed to overcome friction varies with the number of cartridges in the cell.

A flat sheet spring exerts a substantially constant spring force. The force is appropriate when the cell contains the maximum number of cartridges, but excessive when one or more of the cartridges is removed. This may result in remaining cartridges being forced through a cartridge retention mechanism designed to retain cartridges in the cell. Further, flat sheet springs tend to exhibit less wearability and a shorter life than other push mechanisms due to imperfections in the sheet material. A sheet spring is typically only about 0.1 mm (0.004 inches) thick. Accordingly, even small defects may occupy a significant portion of the cross-section of the spring, causing a life-shortening effect.

From the foregoing discussion, it should be apparent that a need exists for an apparatus, system and method that generates a spring force to advance cartridges forward, where the spring force increases in accordance with a number of cartridges in the deep slot cell. Beneficially, such an apparatus would provide increased reliability and component longevity while promoting storage density and cost efficiencies. Such an apparatus, system and method are disclosed and claimed herein.

SUMMARY OF THE INVENTION

The present invention has been developed in response to the present state of the art, and in particular, in response to the problems and needs in the art that have not yet been met for advancing tape media cartridges in a deep slot cell. Accordingly, the present invention has been developed to provide an apparatus, system and method for advancing tape media cartridges in a deep slot cell that overcomes many or all of the above-discussed shortcomings in the art.

An apparatus to generate a spring force increasing in accordance with a quantity of cartridges in a deep slot cell in accordance with the present invention may include a deep slot cell, a biasing element, and an advancement element. The deep slot cell may store a plurality of cartridges sequentially from the front of the cell to the rear of the cell. The cartridges may be stored end to end or back to front.

The biasing element may include a torsion spring to generate a spring force toward the front of the deep slot cell, where the spring force increases in accordance with a number of cartridges in the deep slot cell. Specifically, in certain embodiments, the biasing element may include a rack and pinion mechanism coupled to the torsion spring. The rack and pinion mechanism may include a circular gear coupled to a first end of the torsion spring, and a rack having teeth to engage the circular gear. The rack may extend from the front to the rear of the deep slot cell such that the torsion spring may become loaded by rotation of the gear along the rack toward the rear of the cell. In some embodiments, the rack may be mounted to a floor and/or ceiling of the deep slot cell.

The spring force generated by the biasing element may be controlled by varying one or more of a wire diameter, a mean diameter of the torsion spring, a torsion spring material, a number of turns in the torsion spring, a gear diameter and/or a preload of the torsion spring before a cartridge is inserted into the deep slot cell.

The advancement element may be coupled to the biasing element and positioned to apply the spring force to at least one of the plurality of cartridges to advance each of the cartridges toward the front of the deep slot cell. In one embodiment, the advancement element applies the spring force to a cartridge closest to the rear of the cell. The advancement element may include a pusher frame coupled to the torsion spring to push the cartridges toward the front of the deep slot cell in response to the spring force. In some embodiments, the pusher frame may include a drum extending through a center of the torsion spring. A second end of the torsion spring may be attached to the pusher frame.

In one embodiment, an apparatus in accordance with the present invention includes a deep slot cell to store a plurality of cartridges sequentially from a front to a rear of the deep slot cell, and a biasing element comprising a torsion spring coupled to a rack and pinion mechanism. The torsion spring becomes loaded by rotation of the pinion as it travels substantially linearly along the rack toward the rear of the deep slot cell, wherein the loading increases as a number of cartridges within the deep slot cell increases. The apparatus further includes an advancement element coupled to the biasing element and positioned to apply a force to a cartridge closest to a rear of the deep slot cell. In this manner, the advancement element advances each of the plurality of cartridges toward an opening at the front of the deep slot cell.

An automated tape library to advance media cartridges in a deep slot cell by generating a spring force increasing in accordance with a quantity of cartridges therein is also presented. The automated tape library may include a recording device to read and write data to a media cartridge, a transport device to transport the media cartridge between the recording device and other locations in the automated tape library, and a storage device to store a plurality of media cartridges.

The storage device may include a deep slot cell where each of the plurality of media cartridges reside sequentially from a front to a rear thereof. The deep slot cell may include a biasing element and an advancement element. As in the apparatus, the biasing element may include a torsion spring to generate a spring force toward the front of the deep slot cell, where the spring force increases as a number of media cartridges within the deep slot cell increases. The advancement element may be coupled to the biasing element and positioned to apply the spring force to one or more of the plurality of media cartridges to advance each of the cartridges toward the front of the deep slot cell.

A method of the present invention is also presented to generate a spring force increasing in accordance with a quantity of cartridges in a deep slot cell. The method may include providing a deep slot cell to store a plurality of cartridges sequentially from a front to a rear of the deep slot cell, providing a biasing element including a torsion spring, and positioning the biasing element within the deep slot cell to generate a spring force toward the front of the deep slot cell, where the spring force increases as a number of cartridges within the deep slot cell increases.

The method may further include coupling to the biasing element an advancement element, positioning the advancement element to apply the spring force to at least one of the plurality of cartridges, and advancing, via the advancement element, each of the plurality of cartridges toward the front of the deep slot cell.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
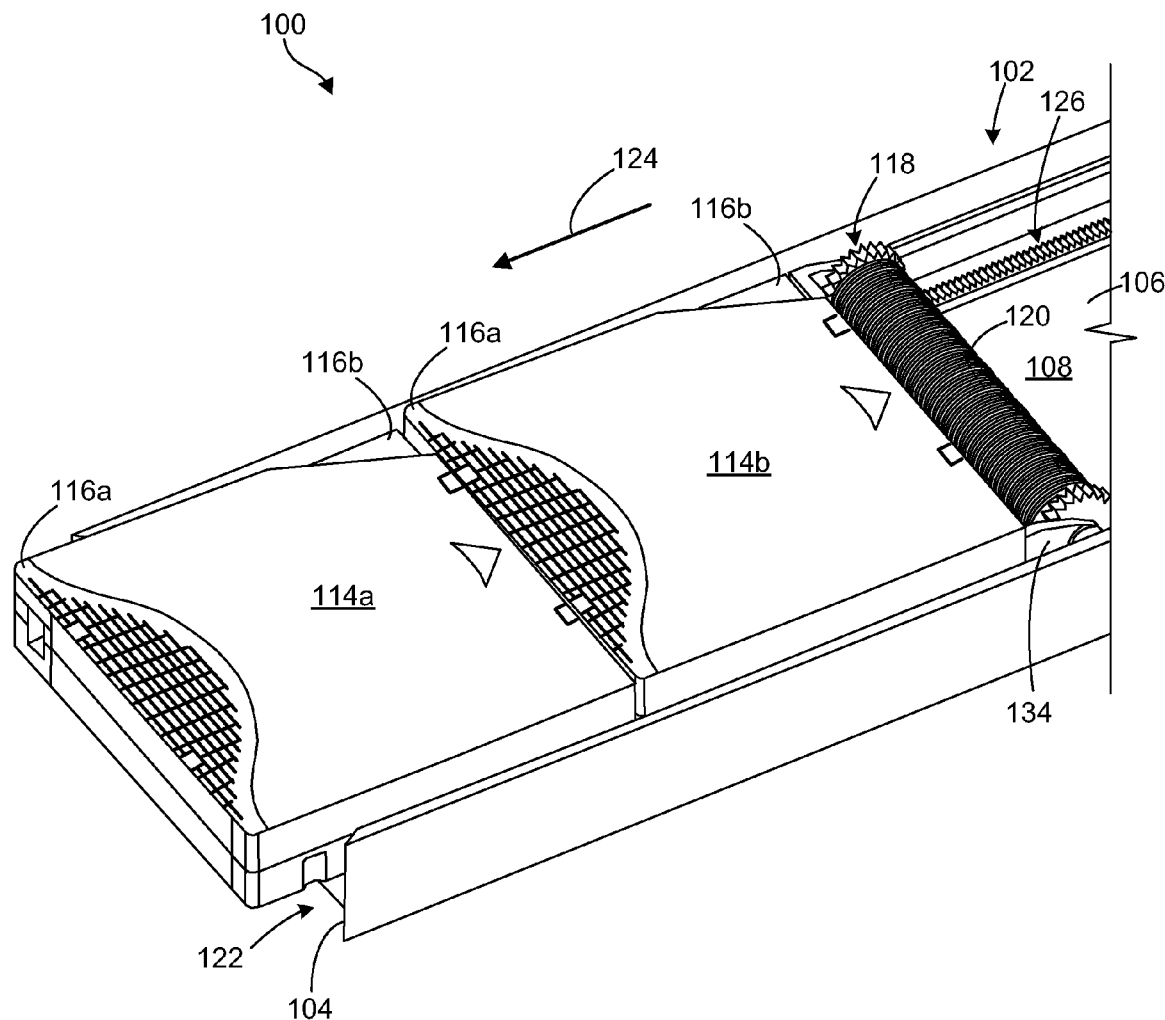
FIG. 1 is a perspective view of a deep slot cell, biasing element and advancement element in accordance with embodiments of the present invention.

Referring now to FIG. 1, an apparatus 100 to generate a spring force increasing in accordance with a quantity of cartridges in a deep slot cell in accordance with the present invention may comprise a deep slot cell 102, a biasing element 118, and an advancement element 134. The deep slot cell 102 may be defined by a floor 108 and a ceiling (not shown) extending from a front 104 of the cell 102 to a rear 106 thereof. The deep slot cell 102 may be configured to store multiple tape media cartridges 114a, 114b. In some embodiments, the cartridges 114 may be stored from the front 104 to the rear 106 of the deep slot cell 102, such that a frontmost tape media cartridge 114a may be selectively accessed and removed by a picker mechanism (not shown).

As shown in FIG. 1, in some embodiments, tape media cartridges 114a, 114b may be oriented to reside sequentially, end 116b to end 116a, from the front 104 to the rear 106 of the deep slot cell 102. In other embodiments, tape media cartridges 114a, 114b may be oriented to reside front to back, side to side, or in any other suitable configuration or orientation known to those in the art.

A biasing element 118 in accordance with the present invention may comprise a torsion spring 120 adapted to generate a spring force 124 toward the front 104 of the deep slot cell 102. The torsion spring 120 may comprise round or square music or stainless steel spring wire, or any other suitable material known to those in the art, and may be made according to conventional spring winding techniques well known in the industry. The biasing element 118 may be positioned behind the cartridges 114a, 114b such that insertion of a cartridge 114 into the cell 102 forces the biasing element 118 toward the rear 106 of the cell 102.

In some embodiments, as discussed in more detail below, the biasing element 118 may be connected to the deep slot cell 102 via a rack and pinion mechanism 126. The biasing element 118 may interact with the rack and pinion mechanism 126 such that movement of the biasing element 118 towards the rear 106 of the deep slot cell 102 effectively loads the torsion spring 120. An amount of spring loading may increase as the biasing element 118 nears the rear 106 of the deep slot cell 102. Indeed, as previously mentioned, insertion of a cartridge 114 into an opening 122 at the front 104 of the deep slot cell 102 may force the biasing element 118 toward the rear 106 of the cell 102. As a result, the biasing element 118, in conjunction with the rack and pinion mechanism 126, may generate a spring force 124 that increases in accordance with a number of cartridges 114 loaded into the deep slot cell 102.

The advancement element 134 may comprise a frame or other structure to apply the spring force 124 to cartridges 114 in the deep slot cell 102. Particularly, the advancement element 134 may be positioned behind and substantially adjacent a rear end 116b of a cartridge 114 to advance the cartridge toward the front 104 of the deep slot cell 102. Where multiple cartridges 114 are stored in the deep slot cell 102, the advancement element 134 may be positioned behind and substantially adjacent a rear end 116b of a cartridge 114b closest to the rear 106 of the deep slot cell 102. In this manner, the advancement element 134 may effectively advance each of the stored cartridges 114 toward the front 104 of the cell 102.

Figure 2:
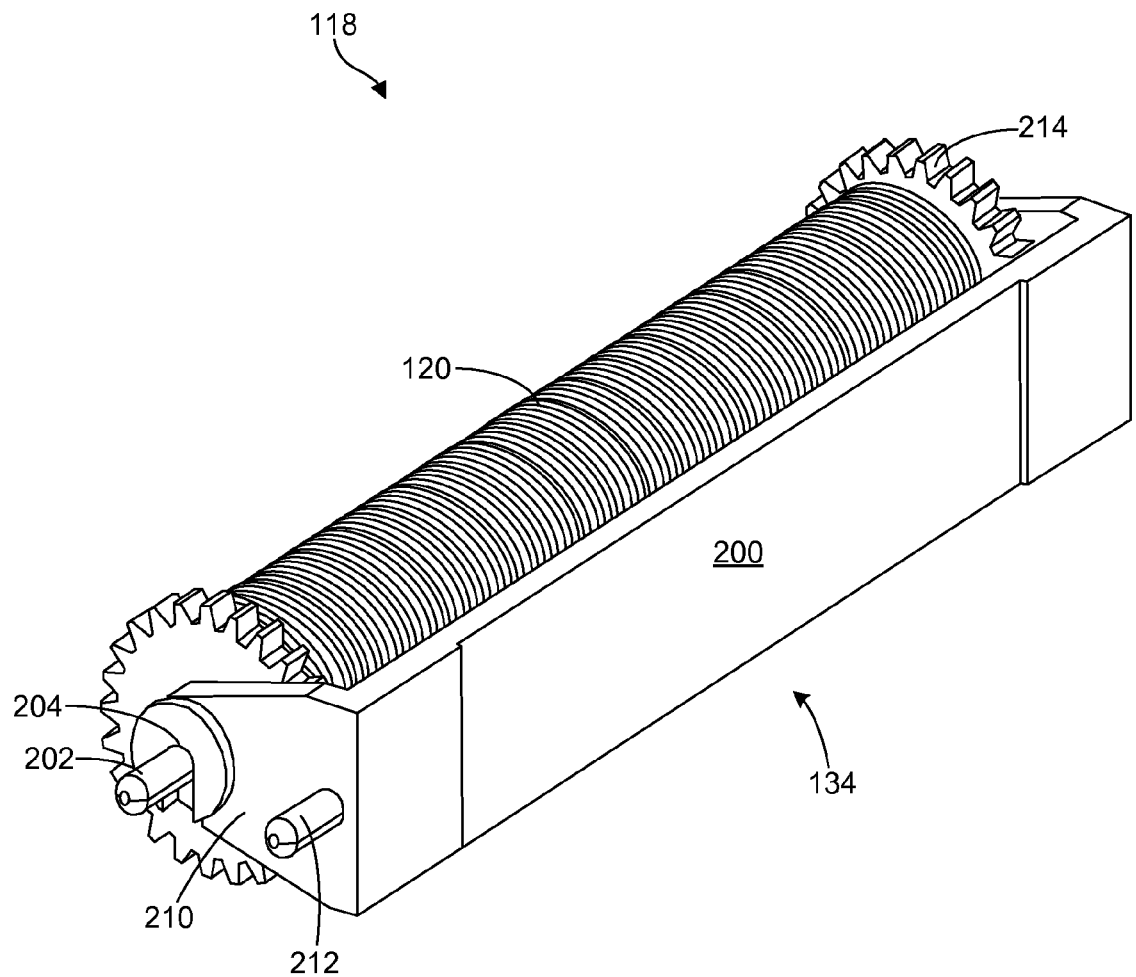
FIG. 2 is an isolated perspective view of the biasing element and advancement element of FIG. 1.

Referring now to FIG. 2, the biasing element 118 may include a drum (not shown) extending through a center of the torsion spring 120 to support and guide the biasing element 118. One or more circular gears 214 may be mounted to the drum at one or both ends of the torsion spring 120. These gears 214 may be components of the rack and pinion mechanism 126.

In some embodiments, the advancement element 134 may include a pusher frame 200 having apertures 204 to engage the drum of the biasing element 118. The pusher frame 200 and apertures 204 may be formed by machining or molding metal or plastic components, or a combination thereof. Alternatively, the pusher frame 200 and apertures 204 may be formed by any other means known to those in the art. The pusher frame 200 may include bearing journals (not shown) to facilitate constrained relative motion between the pusher frame 200 and the drum.

The advancement element 134 may further include an axle 202 extending through the drum and the apertures 204. In one embodiment, the advancement element 134 may also include one or more protrusions 212 extending substantially perpendicularly from the side wall 210 of the pusher frame 200 and substantially parallel to the axle 202. Such protrusions 212 may be utilized to facilitate proper alignment of the biasing element 118 and advancement element 134 with respect to the deep slot cell 102, as discussed in more detail below.

Figure 3:
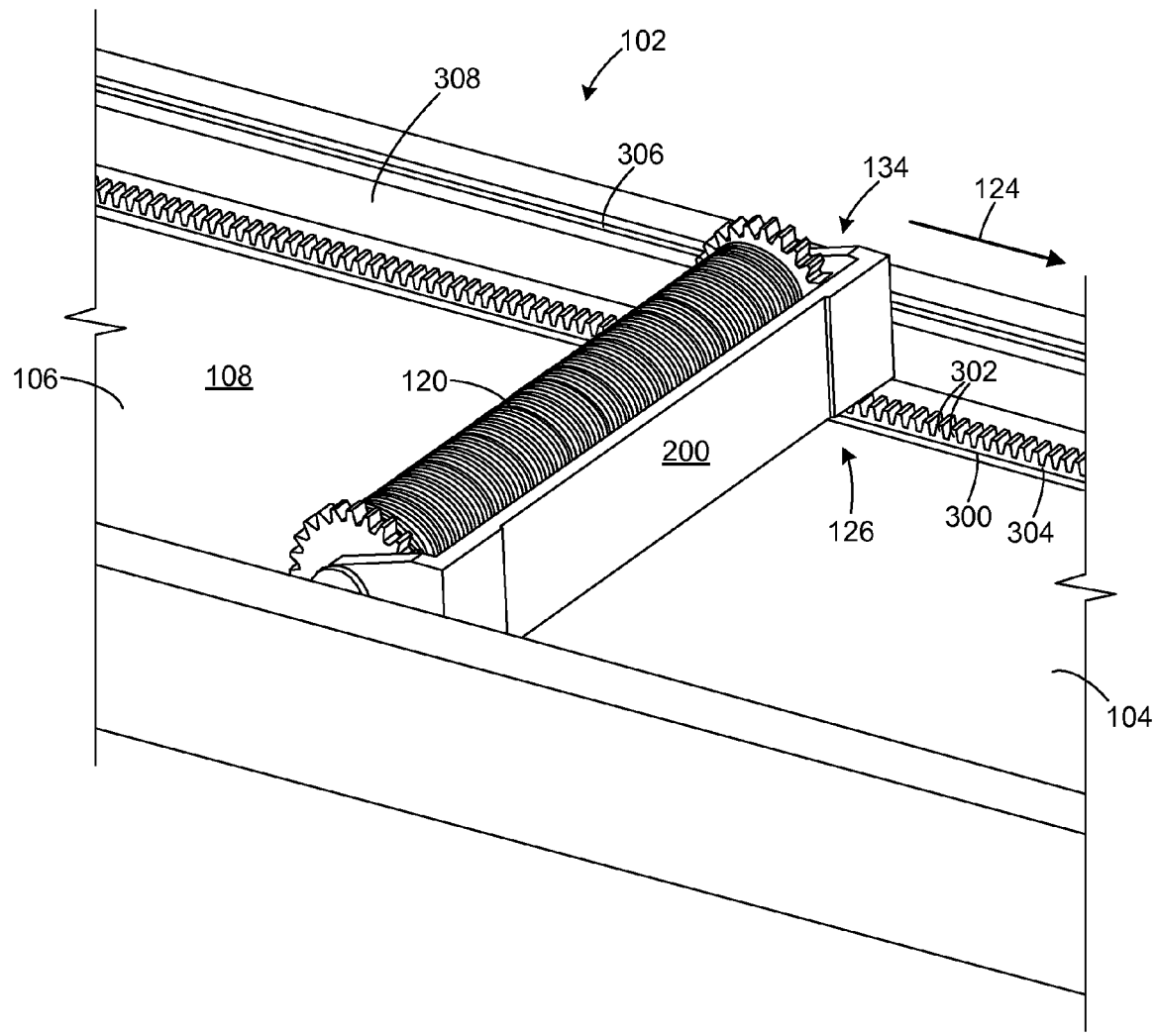
FIG. 3 is a perspective view of one embodiment of a biasing element including a rack and pinion mechanism in accordance with the invention.

Referring now to FIG. 3, one or more racks 300 forming part of the rack and pinion mechanism 126 may be mounted to the floor 108 or ceiling (not shown) of the deep slot cell 102. In other embodiments, the racks 300 may be inset into the floor 108 or ceiling. Such racks 300 may extend along the floor 108 or ceiling from the front 104 to the rear 106 of the deep slot cell 102. Alternatively, the racks 300 may be mounted or inset within the deep slot cell 102 at any other position and in any other manner known to those in the art. The racks 300 may include teeth 302 integrated into a substantially flat bar 304. The teeth 302 may be sized and shaped to engage one or more circular gears 214 mounted to the drum (not shown) of the biasing element 118, the gears 214 also forming part of the rack and pinion mechanism 126.

In operation, the gears 214 may travel substantially linearly along the racks 300 in response to an applied force. In certain embodiments, one or more grooves 306 may be integrated into a wall 308 of the deep slot cell 102 to facilitate a linear direction of travel along the racks 300. Specifically, the grooves 306 may extend along the wall 308 from the front 104 to the rear 106 of the deep slot cell 102, and may be substantially parallel to the floor 108 and/or ceiling. The grooves 306 may support and guide the axle 202 to substantially align the biasing element 118 and advancement element 134 with the racks 300. Additionally, in certain embodiments, the advancement element 134 may include a pusher frame 200 having one or more protrusions 212 extending from a side wall 210 thereof. The grooves 306 may also support and guide the protrusions 212 to further facilitate a linear direction of travel along the racks 300.

In one embodiment, one end of the torsion spring 120 may be attached to a circular gear 214, while a second end may be fixed to a non-rotating portion of the advancement element 134 or pusher frame 200. As previously discussed, insertion of a cartridge 114 into the deep slot cell 102 may force the biasing element 118 toward the rear 106 of the deep slot cell, causing the gear 214 to travel substantially linearly along the rack 300 in the same direction. As a result, an increased number of turns may be imparted to the torsion spring 120, increasing the torque generated thereby.

Figure 4:
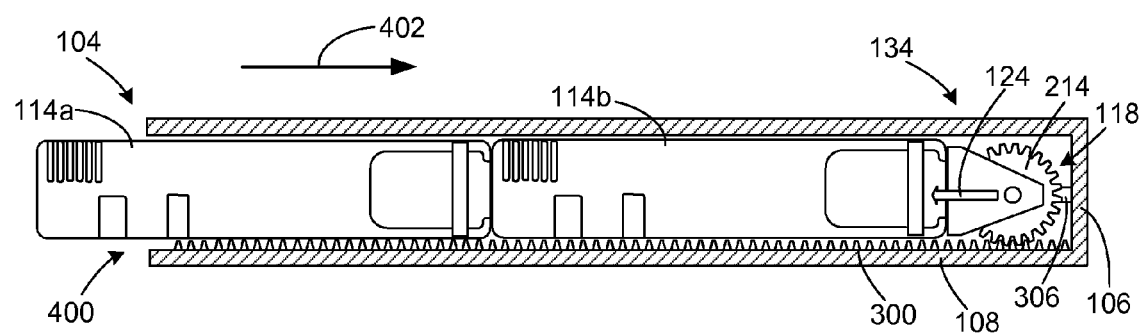
FIG. 4 is a side view of one embodiment of a deep slot cell and biasing element being loaded with multiple cartridges.
Figure 5:
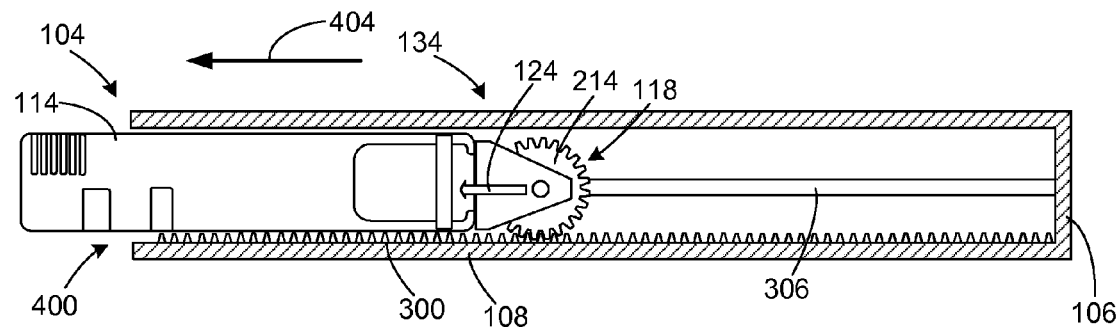
FIG. 5 is a side view of one embodiment of a cartridge being advanced to the front of a deep slot cell in accordance with the invention.

Referring now to FIGS. 4 and 5, inserting a cartridge 114 into an opening 400 at the front 104 of the deep slot cell 102 may cause a rear end 116b of the cartridge 114 to substantially abut the advancement element 134, forcing the advancement element 134 and the biasing element 118 in a rearward direction 402. Inserting an increased number of cartridges 114 may force the advancement element 134 and biasing element 118 deeper into the cell 102. Further, in certain embodiments, inserting an increased number of cartridges 114 into the cell 102 may force a circular gear 214 coupled to an end of the torsion spring 120 to travel a greater distance along the rack 300, thus imparting a greater number of turns to the torsion spring 120. As a result, the torsion spring 120 may generate an increased spring force 124 toward the front 104 of the deep slot cell 102.

As illustrated by FIG. 5, the spring force 124 generated by the torsion spring 120 may be fully or partially unleashed by removing a cartridge 114 from the cell 102. As previously discussed, the torque generated by the torsion spring 120 increases in accordance with the number of cartridges 114 inserted into the deep slot cell 102. Likewise, the reaction force generated by the gear 214 on the rack 300 also increases with the number of cartridges 114 in the cell 102. Advantageously, this produces more thrust in a forward direction 404 at a time when more cartridges 114 are generating more friction. In this manner, an amount of force exerted by the present invention to advance a cartridge 114 to the front 104 of the cell 102 may be tailored to a number of cartridges 114 stored therein.

The precise value of the force generated by the present invention may be controlled by varying system parameters, such as torsion spring 120 wire diameter, torsion spring 120 mean diameter, torsion spring 120 material, a number of turns in the torsion spring 120, gear 214 diameter, and a preload of the torsion spring 120 before the first cartridge 114 is inserted into the deep slot cell 102.

Figure 6:
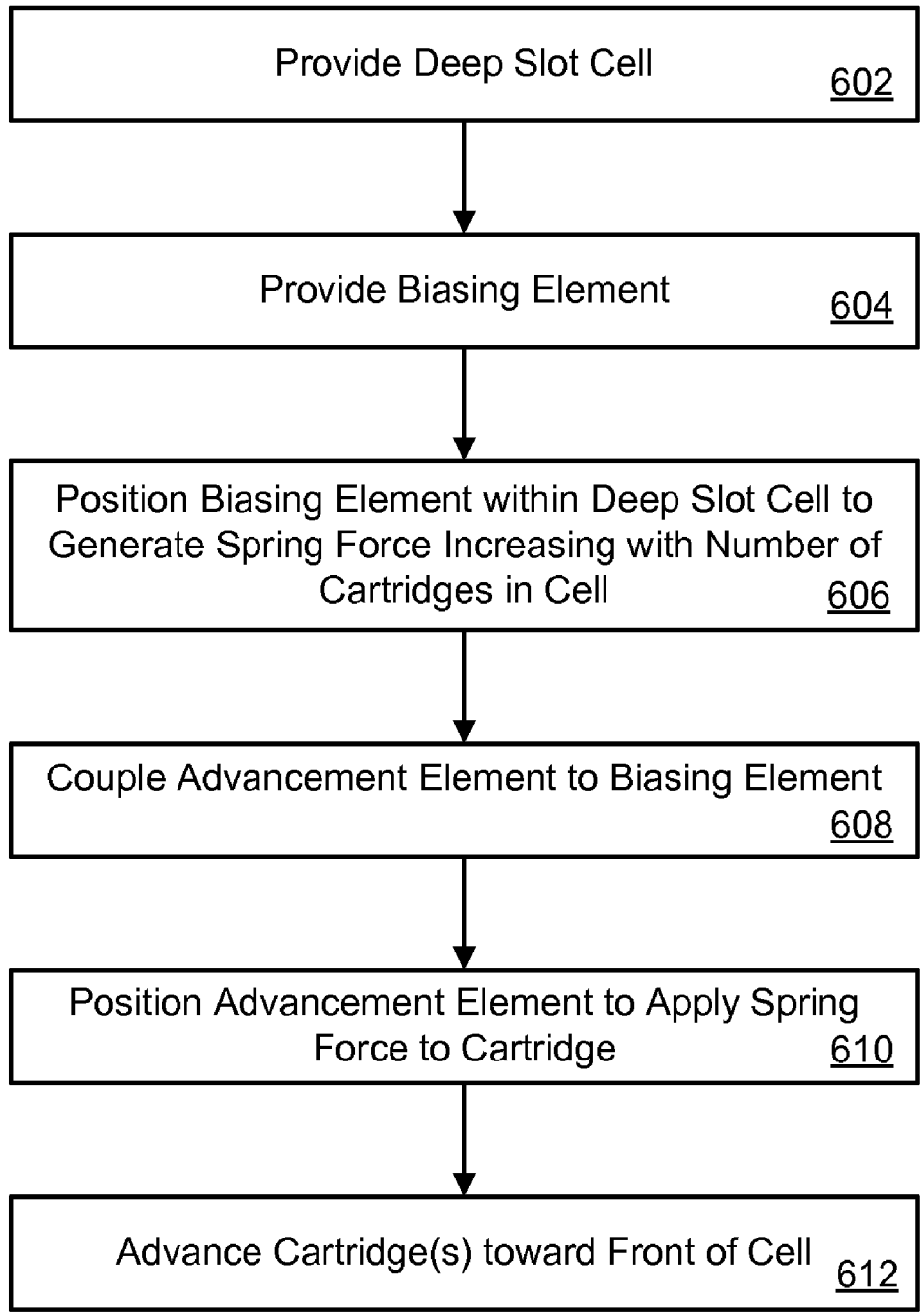
FIG. 6 is a flow chart illustrating one embodiment of a method to generate a spring force to advance cartridges in a deep slot cell in accordance with the present invention.

Referring now to FIG. 6, a method 600 to generate a spring force in accordance with the present invention may include providing 602 a deep slot cell and providing 604 a biasing element including a torsion spring. In certain embodiments, the deep slot cell may be adapted to store multiple cartridges sequentially from a front to a rear of the cell.

The biasing element may be positioned 606 within the cell to generate a spring force toward the front of the cell. This spring force may increase in accordance with the number of cartridges stored in the deep slot cell. In some embodiments, the biasing element may be coupled 608 to an advancement element. The advancement element may be positioned 610 to apply the spring force to one or more of the stored cartridges. In this manner, the advancement element may advance 612 the cartridges toward an opening at the front of the deep slot cell, thereby enabling a frontmost cartridge to be selectively accessed by a picker mechanism.

Figure 7:
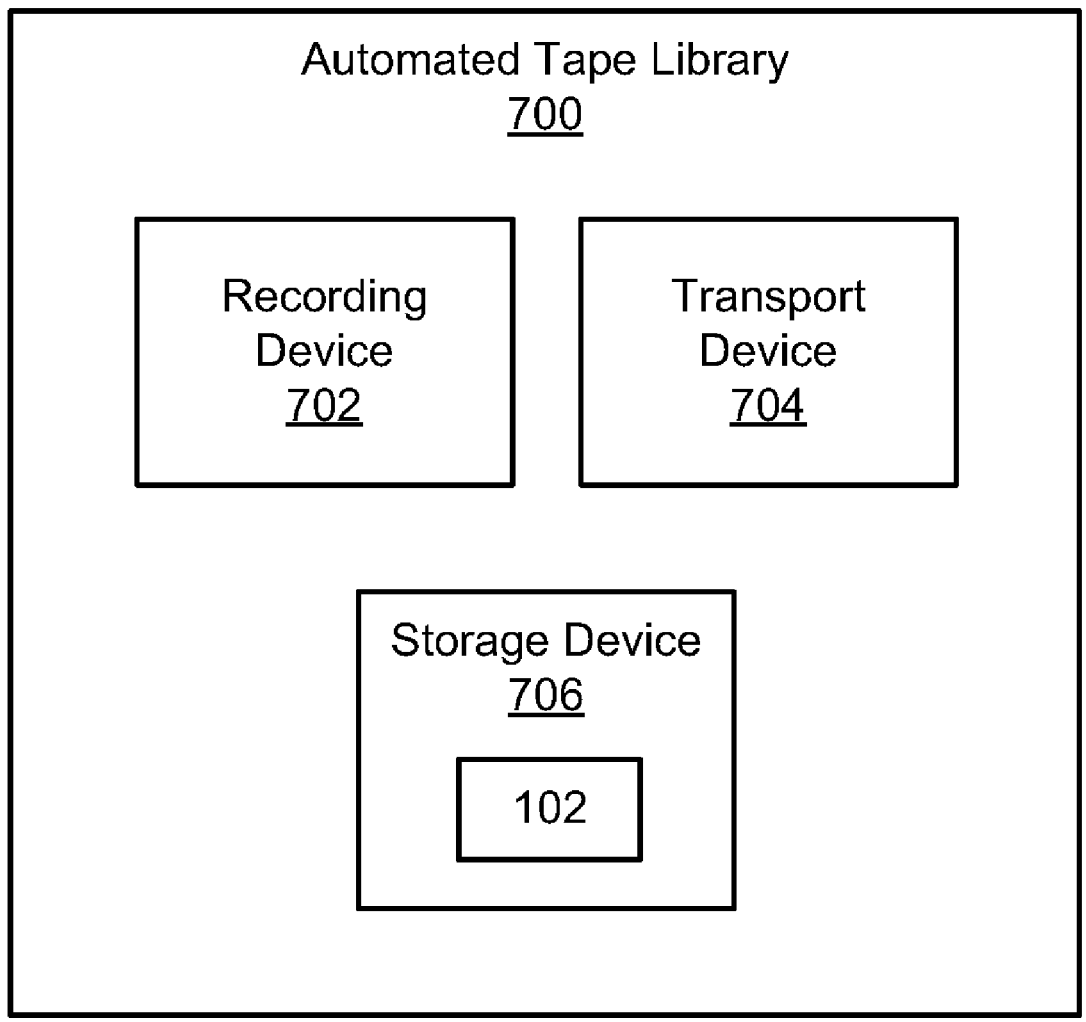
FIG. 7 is a schematic block diagram illustrating one embodiment of an automated tape library in accordance with the present invention.

FIG. 7 illustrates one embodiment of an automated tape library 700 that includes a recording device 702, a transport device 704, and a storage device 706. Furthermore, in the depicted embodiment, the storage device 706 includes the deep slot cell 102 described above in relation to FIG. 1. The recording device 702 may read and write data to a media cartridge 114 and the transport device 704 may transport the media cartridge 114 between the recording device 702 and other locations in the automated tape library 700.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to generate a spring force increasing in accordance with a quantity of cartridges in a deep slot cell, the apparatus comprising:
   a deep slot cell to store a plurality of cartridges, each of the plurality of cartridges residing sequentially from a front to a rear of the deep slot cell;
   a biasing element comprising a torsion spring to generate a spring force toward the front of the deep slot cell, wherein the spring force increases as a number of cartridges within the deep slot cell increases; and
   an advancement element coupled to the biasing element and positioned to apply the spring force to at least one of the plurality of cartridges to advance each of the plurality of cartridges toward the front of the deep slot cell.

2. The apparatus of claim 1, wherein each of the plurality of cartridges resides sequentially end to end from the front to the rear of the deep slot cell.

3. The apparatus of claim 1, wherein each of the plurality of cartridges resides sequentially front to back from the front to the rear of the deep slot cell.

4. The apparatus of claim 1, wherein the at least one of the plurality of cartridges is a cartridge closest to the rear of the deep slot cell.

5. The apparatus of claim 1, wherein the biasing element comprises a rack and pinion mechanism coupled to the torsion spring.

6. The apparatus of claim 5, wherein the rack and pinion mechanism comprises:
   a circular gear coupled to a first end of the torsion spring; and
   a rack extending from the front to the rear of the deep slot cell and having teeth engageable with the circular gear, wherein the torsion spring becomes loaded by rotation of the gear as it travels substantially linearly along the rack toward the rear of the deep slot cell.

7. The apparatus of claim 6, wherein the rack is mounted to at least one of a floor and a ceiling of the deep slot cell.

8. The apparatus of claim 1, wherein the advancement element further comprises a pusher frame coupled to the torsion spring to push the at least one of the plurality of cartridges toward the front of the deep slot cell in response to the spring force.

9. The apparatus of claim 8, wherein the pusher frame comprises a drum extending through a center of the torsion spring and wherein a second end of the torsion spring is attached to the pusher frame.

10. The apparatus of claim 1, wherein the spring force generated by the biasing element is controlled by at least one of a wire diameter, a mean diameter of the torsion spring, a torsion spring material, a number of turns in the torsion spring, a gear diameter, and a preload of the torsion spring before a cartridge is inserted into the deep slot cell.

11. An automated tape library to advance media cartridges in a deep slot cell by generating a spring force increasing in accordance with a quantity of media cartridges therein, the automated tape library comprising:
   a recording device to read and write data to a media cartridge;
   a transport device to transport the media cartridge between the recording device and other locations in an automated tape library; and
   a storage device comprising a deep slot cell to store a plurality of media cartridges, each of the plurality of media cartridges residing sequentially from a front to a rear of the deep slot cell, the deep slot cell comprising:
      a biasing element comprising a torsion spring to generate a spring force toward the front of the deep slot cell, wherein the spring force increases as a number of media cartridges within the deep slot cell increases; and
      an advancement element coupled to the biasing element and positioned to apply the spring force to at least one of the plurality of media cartridges to advance each of the plurality of media cartridges toward the front of the deep slot cell.

12. The automated tape library of claim 11, wherein the at least one of the plurality of media cartridges is a media cartridge closest to the rear of the deep slot cell.

13. The automated tape library of claim 11, wherein the biasing element comprises a rack and pinion mechanism coupled to the torsion spring.

14. The automated tape library of claim 13, wherein the rack and pinion mechanism comprises:
   a circular gear coupled to a first end of the torsion spring; and
   a rack extending from the front to the rear of the deep slot cell and having teeth engageable with the circular gear, wherein the torsion spring becomes loaded by rotation of the gear as it travels substantially linearly along the rack toward the rear of the deep slot cell.

15. The automated tape library of claim 14, wherein the rack is mounted to at least one of a floor and a ceiling of the deep slot cell.

16. The automated tape library of claim 11, wherein the advancement element further comprises a pusher frame coupled to the torsion spring to push the at least one of the plurality of cartridges toward the front of the deep slot cell in response to the spring force.

17. The automated tape library of claim 16, wherein the pusher frame comprises a drum extending through a center of the torsion spring and wherein a second end of the torsion spring is attached to the pusher frame.

18. The automated tape library of claim 11, wherein the spring force generated by the biasing element is controlled by at least one of a wire diameter, a mean diameter of the torsion spring, a torsion spring material, a number of turns in the torsion spring, a gear diameter, and a preload of the torsion spring before a cartridge is inserted into the deep slot cell.

19. A method to generate a spring force increasing in accordance with a quantity of cartridges in a deep slot cell, the method comprising:
providing a deep slot cell to store a plurality of cartridges sequentially from a front to a rear of the deep slot cell;
providing a biasing element comprising a torsion spring;
positioning the biasing element within the deep slot cell to generate a spring force toward the front of the deep slot cell, wherein the spring force increases as a number of cartridges within the deep slot cell increases;
coupling to the biasing element an advancement element;
positioning the advancement element to apply the spring force to at least one of the plurality of cartridges; and
advancing, via the advancement element, each of the plurality of cartridges toward the front of the deep slot cell.

20. An apparatus to generate a spring force increasing in accordance with a quantity of cartridges in a deep slot cell, the apparatus comprising:
a deep slot cell to store a plurality of cartridges sequentially from a front to a rear of the deep slot cell;
a biasing element comprising a torsion spring coupled to a rack and pinion mechanism, wherein the torsion spring becomes loaded by rotation of the pinion as it travels substantially linearly along the rack toward the rear of the deep slot cell, wherein the loading increases as a number of cartridges within the deep slot cell increases; and
an advancement element coupled to the biasing element and positioned to apply a force to a cartridge closest to the rear of the deep slot cell to advance each of the plurality of cartridges toward an opening at the front of the deep slot cell.

* * * * *